(12) United States Patent
Ikeda

(10) Patent No.: US 9,277,840 B2
(45) Date of Patent: Mar. 8, 2016

(54) ARRANGEMENT INTRODUCED IN A GRILL RAISING MECHANISM

(76) Inventor: Tadaharu Ikeda, Sao Paulo (BR)

( * ) Notice: Subject to any disclaimer, the term of this patent is extended or adjusted under 35 U.S.C. 154(b) by 1063 days.

(21) Appl. No.: 13/139,913

(22) PCT Filed: Dec. 16, 2009

(86) PCT No.: PCT/BR2009/000425
§ 371 (c)(1),
(2), (4) Date: Aug. 8, 2011

(87) PCT Pub. No.: WO2010/069025
PCT Pub. Date: Jun. 24, 2010

(65) Prior Publication Data
US 2011/0283989 A1    Nov. 24, 2011

(30) Foreign Application Priority Data

Dec. 19, 2008 (BR) .................................. 8802810 U

(51) Int. Cl.
*A47J 37/07* (2006.01)
*F24C 1/16* (2006.01)

(52) U.S. Cl.
CPC ...... *A47J 37/0704* (2013.01); *A47J 2037/0795* (2013.01)

(58) Field of Classification Search
USPC ........ 99/340, 398, 421 H, 445; 126/25 R, 9 R
See application file for complete search history.

(56) References Cited

U.S. PATENT DOCUMENTS

| | | | | |
|---|---|---|---|---|
| 1,045,049 | A * | 11/1912 | Longfellow | 99/398 |
| 1,533,256 | A * | 4/1925 | McCaul | F24C 15/16 |
| | | | | 126/337 A |
| 2,507,493 | A * | 5/1950 | Bailey | 431/205 |
| 2,536,954 | A * | 1/1951 | Olsen | 254/91 |
| 2,608,149 | A * | 8/1952 | Ellis | 99/421 HV |
| 2,618,730 | A * | 11/1952 | Panken | 99/340 |
| 2,654,307 | A * | 10/1953 | Nisenson | 99/421 H |
| 4,462,306 | A * | 7/1984 | Eisendrath | 99/340 |
| 4,541,406 | A * | 9/1985 | DaSambiagio | 126/9 R |
| 4,658,710 | A | 4/1987 | Quet et al. | |
| 4,760,776 | A * | 8/1988 | Beidler | A47J 37/041 |
| | | | | 99/419 |
| 5,146,842 | A * | 9/1992 | Romano | A47J 37/04 |
| | | | | 126/25 R |
| 5,213,027 | A * | 5/1993 | Tsotsos et al. | 99/339 |
| 5,363,752 | A * | 11/1994 | Weil | 99/445 |
| 5,458,053 | A * | 10/1995 | Hsiao | 99/444 |
| 5,660,101 | A | 8/1997 | Cirigliano | |
| 6,609,512 | B2 * | 8/2003 | Poe et al. | 126/25 A |
| 6,694,965 | B1 * | 2/2004 | Chen | 126/25 A |
| 7,878,186 | B2 * | 2/2011 | Cusack | 126/25 R |
| 8,272,321 | B1 * | 9/2012 | Kalsi et al. | 99/421 H |

FOREIGN PATENT DOCUMENTS

ES    2 126 462    3/1999

* cited by examiner

*Primary Examiner* — Steven B McAllister
*Assistant Examiner* — Desmond C Peyton
(74) *Attorney, Agent, or Firm* — Michael J. Striker

(57) ABSTRACT

A raising mechanism of a movable lower grill grid formed with a hand crank mounted to lateral columns of a frame of a barbecue grill and a worm provided in a middle point of the hand crank. A cross-sectional rotary axis is arranged below a fixed upper grill grid and a worm wheel with one end engages the worm. Pulleys are mounted to respective ends of the axis. Steel cables include ends mounted to the pulleys and lower ends mounted to lateral tabs of the lower grill grid. The mechanism also includes a casing for housing and protecting the mechanism.

1 Claim, 3 Drawing Sheets

ARRANGEMENT INTRODUCED IN A GRILL RAISING MECHANISM

The present specification refers to a utility model patent for a grill grid raising mechanism belonging to the field of barbecue grill components, which has received an arrangement to provide a better performance and usage than the conventional items.

It is already known in the art a barbecue grill essentially comprising: a substantially rectangular prism-shaped frame; and an assembly mounted to the frame comprising: a fixed upper grill grid; front and rear cross members arranged downstream the upper grill grid and intended to support the spits; a movable lower grill grid; and a raising mechanism fastening the lower grill grid, which is moved by a lever projecting from the front face of the frame. Usually, this type of barbecue grill is for household use and is mounted to a structure generally made of masonry essentially comprising the following: stand; charcoal tray above which the grill grid is placed; barbecue grill front access window; and upper chimney situated above the barbecue grill.

The conventional construction of mechanisms for raising barbecue grills substantially comprises: the mentioned lever is mounted to and turns on top of the right, front and rear columns of the frame, whose middle point features a spindle; cross-sectional rotary axis mounted to the sidewalls of the frame, below the upper grill grid, and a toothed wheel is provided at one end of the frame to engage the lever spindle; two spindles mounted to the respective ends of the axis; and two steel cables whose upper ends are mounted to the respective end spindles of the upper axis and are coupled with the helical channels of said spindles and the lower ends of said cables are connected in the middle points of the sidewalls of the lower grill grid.

Said raising mechanism has been designed to achieve a simple solution in order to avoid complicating or turning more expensive the manufacture of the barbecue grill while suitably accomplishing with its function.

While the conventional mechanism accomplishes its function, it does have some drawbacks. One of them results from the fact that the mechanism is directly exposed to the hot charcoal burning, and often grease and wastes of the food being cooked in the barbecue grill get stuck to the mechanism, what jeopardizes its state and working. The fact that the mechanism retains grease and food residues endangers the hygiene state of the assembly as well. On the other hand, cleaning such mechanism is relatively difficult.

Another inconvenient is related to the fact that when the steel cables are wound around the axis spindles they bend inwards and above the grill, thus being even more exposed to the action of the heat, grease and food residues.

With the time, the movable parts of the mechanism get impregnated with grease and residues and stuck.

Another drawback associated with conventional raising mechanisms is that their levers often do not fit the "wind screen" of the masonry barbecue to which the barbecue grill mechanism featuring the raising mechanism is mounted. As a matter of fact, there are cases where the "wind screen" of the masonry barbecue is so close to the lever that it makes difficult or even prevents the lever from being moved.

Therefore, the object of this utility model patent is to provide a raising mechanism capable of overcoming the above drawbacks.

Another object is to provide a raising mechanism which further to overcoming the above problems will not require more complex levels of construction and manufacturing which would turn it less interesting than the conventional devices.

Another object is to provide a raising mechanism for a suitable cost.

Another object is to provide a raising mechanism which improves the general appearance of the barbecue grill.

Therefore, in view of the above-mentioned drawbacks, and aimed at overcoming them, and further achieving the related objects, an arrangement has been designed and introduced into a grill grid raising mechanism, object of the present utility model patent, which consists of the following: two hollow columns housing steel cables are mounted in the middle of the sidewalls of the barbecue grill frame, and the right column is crossed by the lever and houses its spindle and the axis toothed wheel; a upper hollow cross member housing the axis is mounted between the columns and below the upper grill grid; two pulleys mounted at the respective ends of the axis, housed in the columns and to which the upper ends of the cables are mounted, whose lower ends are mounted to the external lateral tabs of the lower grill grid, which are inserted and displaced upwards and downwards into longitudinal notches of the columns. The raising mechanism further includes a device to fit it to the "wind screen" of a masonry barbecue, essentially comprising the spindle incorporated into the external surface of a sleeve, which is crossed by the lever and provided with a leveling screw for fastening the sleeve to the lever.

Such construction solves the above-mentioned drawbacks, as all components of the mechanism are housed and protected inside the columns and the upper cross member, and as such they are not affected by the heat, grease and food residues. On the other hand, because of said construction, cleaning the raising mechanism is much easier, as it may be cleaned being supported over the flat surfaces of the columns and upper cross member. Further, in view of the fact that pulleys are provided to replace the spindles in the axis ends, the winding cables do not bend inwards and above the lower grill grid such as it happens with the conventional mechanism, and thus the cables are kept protected inside the columns.

Further, the use of lateral columns and the upper cross member hiding the mechanism improves the general appearance of the barbecue grill.

On the other hand, the leveling screw of the lever adjusting device to the "wind screen" enables releasing the lever and sleeve containing the spindle one from the other, and to displace the lever axially ahead until its grasping arm is in front of the masonry "wind screen". Such resource enables setting up the barbecue grill mechanism with the raising mechanism to masonry barbecues featuring a close "wind screen", as it enables turning the lever freely in front of the "wind screen".

The attached drawings refer to an arrangement introduced into a grill grid raising mechanism object of this patent, in which.

Figure 1:
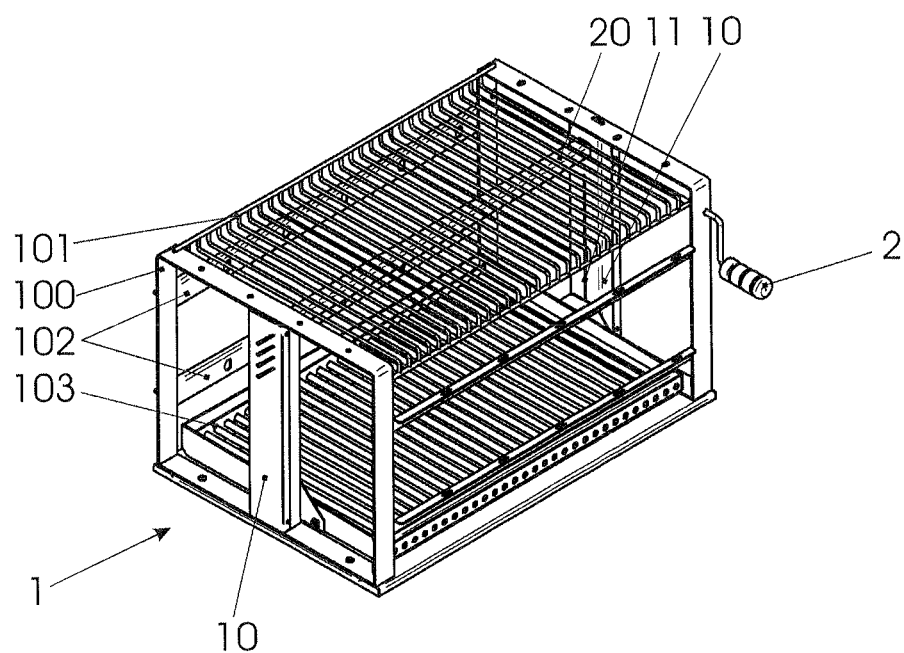
FIG. 1 shows a perspective view of the barbecue grill featuring the raising mechanism in which the columns and cross member for housing the mechanism are seen.
Figure 2:
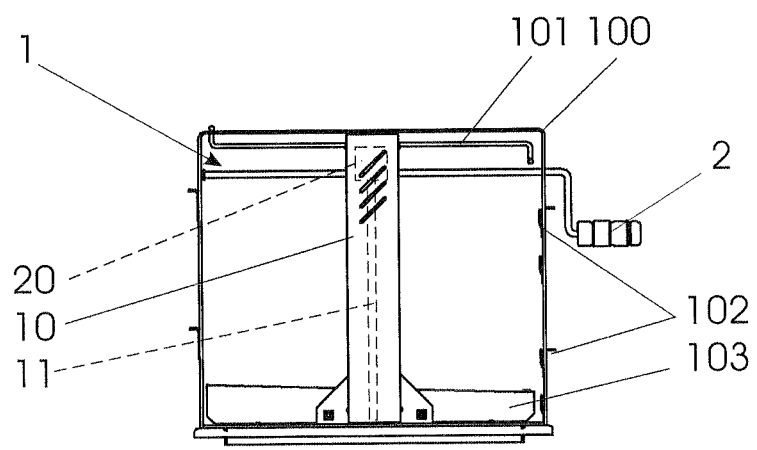
FIG. 2 shows a side view of the barbecue grill.
Figure 3:
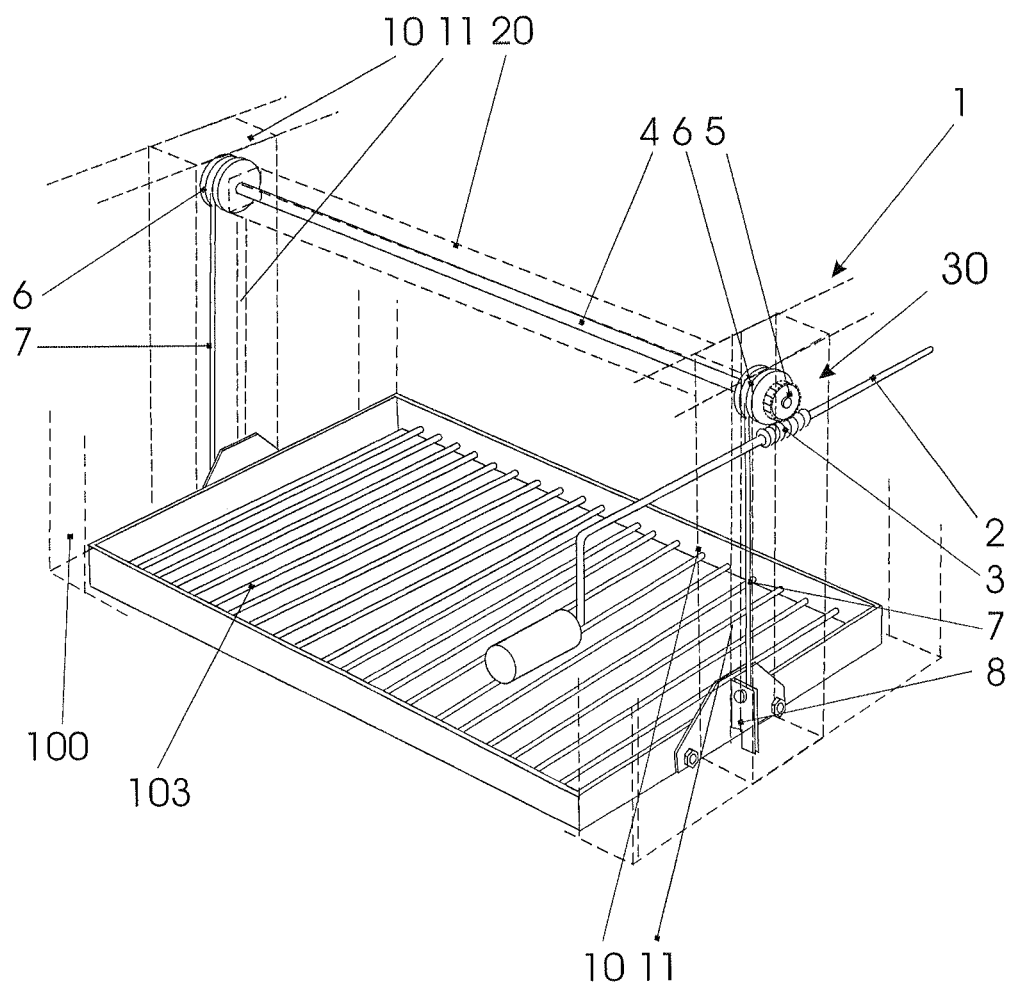
FIG. 3 shows a view of the mechanism taken alone wherein the dotted line shows the columns and upper cross member for a better understanding.

According to what is shown in the above-mentioned drawings, the raising mechanism 1, object of the present utility model patent, is part to the barbecue grill grid and essentially comprises (FIGS. 1, 2): a substantially rectangular prism-shaped frame 100; and an assembly mounted to the frame comprising: fixed upper grill grid 101; front and rear cross members 102 arranged below the upper grill grid and intended to support the spits (not shown); movable lower grill grid 103; and the raising mechanism 1 which fastens the lower grill grid 103 and substantially comprises (FIGS. 1, 2, 3): lever (hand crank) 2, which is mounted to and rotates on top of the right, front and rear columns, frame 100 whose grasping end is turned ahead and the middle point of said lever (hand crank) 2 incorporating an axial spindle (worm) 3; a cross-sectional rotary axis 4 arranged below the upper grill grid 101 at whose end a toothed wheel (worm wheel) 5 is provided to engage the spindle (worm) 3 of lever (hand crank) 2; winding means (pulleys) 6 mounted to the respective ends of axis 4; and two steel cables 7 whose upper ends are mounted to the respective winding means (pulleys) 6 and lower ends connected at the sidewalls of the lower grill grid 103.

According to the present arrangement, the mechanism 1 features a casing intended to house and protect the mechanism, substantially consisting of the following: two hollow columns 10 housing the steel cables 7, located in the middle of the frame sidewalls 100, and which are substantially structural iron shaped columns featuring longitudinal notches 11 turned inwards the barbecue grill; and upper hollow cross member 20 housing axis 4 and mounted between the upper ends of the columns under the fixed upper grill grid 101.

In order to fit such casing, the mechanism itself features winding means (pulleys) 6 comprising two pulleys mounted to the respective ends of axis 4, housed inside the respective columns 10 where they connect, and respective steel cables 7 which may be wound and the lower grill grid sidewalls 103 are provided with respective external tabs 8, in which the lower ends of the respective steel cables 7 are mounted and which are introduced and moved through the longitudinal notches 11 of the columns 10.

The right column 10 is crossed by lever (hand crank) 2 and its spindle (worm) 3 and the toothed wheel (worm wheel) 5 of axis 4 to which said spindle (worm) couples are housed inside said column 10.

Figure 4:
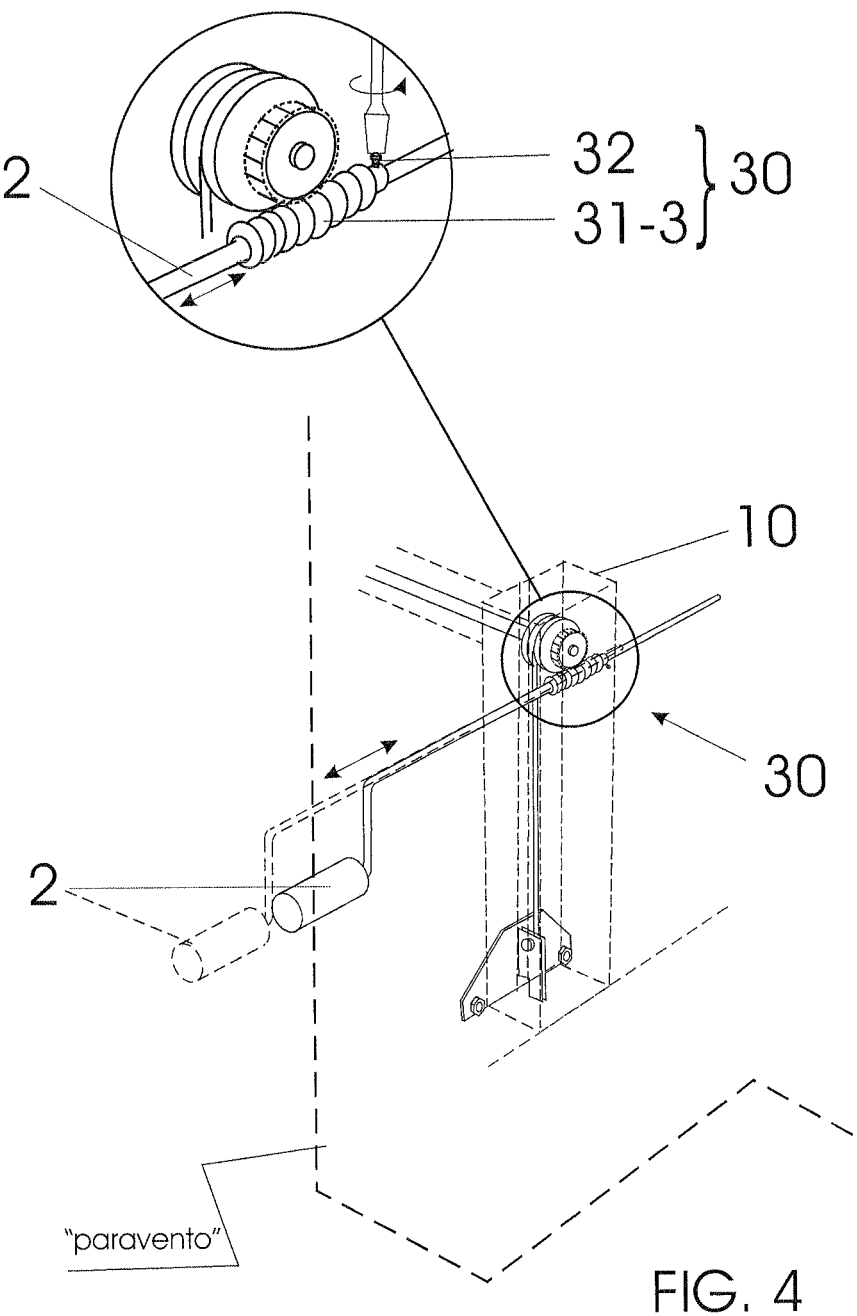
FIG. 4 shows a detail of the lever adjusting device to the masonry "wind screen".

Another part of the raising mechanism is a device 30 (FIG. 4) for adjusting lever (hand crank) 2 to the "wind screen" of masonry barbecues to which the present barbecue grill can be mounted. The referred to device 30 essentially comprises: a sleeve 31, which externally incorporates the spindle (worm) 3 and is crossed by lever (hand crank) 2; and a leveling screw 32 screwed to the radial hole of the sleeve 31 whose end clamps against the lever (hand crank) 2 and fastens it to the sleeve.

The present raising mechanism works conventionally, i.e. when lever (hand crank) 2 is rotated in a suitable direction, its spindle (worm) 3 engages the toothed wheel (worm wheel) 5 of axis 4 and rotates the axis and pulleys 6, what causes the steel cables 7 to wind around them, and raise the lower grill grid 103, whose lateral tabs 8, connected to cables 7, slip through the notches 11 of columns 10. To lower it, lever (hand crank) 2 should be turned in the opposite direction.

For adjusting lever (hand crank) 2 to the "wind screen" of the masonry barbecue, the screw 32 must be loosened to release the lever (hand crank) 2 from the sleeve 31 containing the spindle (worm) 3. Therefore, as the sleeve 31 is kept axially to the walls of column 10, the lever (hand crank) 2 may be displaced axially forward to the position where its grasping arm projects ahead in respect of the "wind screen". After that, the screw 32 is tightened again and the lever (hand crank) 2 and sleeve 31 assembly containing the spindle (worm) 3 come back to work together. According to the above-described basic construction, materials, dimensions, constructive details and/or functional and/or ornamental configuration of the object of the present patent may be changed without departing from the scope of the protection claimed.

The invention claimed is:

1. A grill grid raising mechanism for use with a barbecue grill, the barbecue grill comprising: a substantially rectangular prism-shaped frame having laterally spaced front columns and laterally spaced rear columns; and an assembly mounted to the frame comprising: a fixed upper grill grid (101); front and rear cross members arranged below the upper grill grid notched for supporting spits; a movable lower grill grid; and a raising mechanism which fastens the lower grill grid and substantially comprises: a hand crank, mounted on upper portions of one of said laterally spaced front columns and one of said laterally spaced rear columns whose handle is on a front side, and a worm is provided and incorporated in the middle point of said hand crank; a laterally extending rotary axle, arranged below the upper grill grid, in one end of which a toothed wheel is provided to engage the worm; pulleys mounted to respective ends of the axle; and two steel cables whose upper ends are mounted to the respective pulleys and the lower ends connected to the sidewalls of the lower grill grid, characterized in that the grill grid raising mechanism is provided with a casing configured to house and protect the mechanism, said casing consisting substantially of the following:

two hollow columns, housing the steel cables, located in the middle of lateral sides of the frame, and having a substantially structural iron shape and featuring longitudinal notches facing toward an inner portion of the barbecue grill; and an upper hollow cross member mounted between the upper ends of the hollow columns, arranged under the fixed upper grill grid housing the axle;

wherein said raising mechanism comprising the respective pulleys to be housed inside the respective hollow columns and to which the respective steel cables are wound;

wherein the side walls of the lower grill grid are provided with respective external tabs, where the lower ends of the respective steel cables are mounted, the respective external tabs moving vertically through the longitudinal notches in the hollow columns;

wherein one of the hollow columns houses the worm of the hand crank, and the worm wheel of the axle, to which said worm is coupled; and wherein said raising mechanism further comprises a device for adjusting the hand crank, comprising: a sleeve formed on the worm through which the hand crank passes and a set screw screwed in a radial hole of the sleeve securing the worm relative to said hand crank, and which may be loosened to displace the hand crank axially.

* * * * *